US009684827B2

(12) United States Patent
Zhang et al.

(10) Patent No.: US 9,684,827 B2
(45) Date of Patent: Jun. 20, 2017

(54) EYE GAZE TRACKING BASED UPON ADAPTIVE HOMOGRAPHY MAPPING

(71) Applicant: MICROSOFT TECHNOLOGY LICENSING, LLC, Redmond, WA (US)

(72) Inventors: Zhengyou Zhang, Bellevue, WA (US); Qin Cai, Clyde Hill, WA (US); Zicheng Liu, Bellevue, WA (US); Jia-Bin Huang, Urbana, IL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 375 days.

(21) Appl. No.: 14/226,467

(22) Filed: Mar. 26, 2014

(65) Prior Publication Data

US 2015/0278599 A1 Oct. 1, 2015

(51) Int. Cl.
G06T 7/80 (2017.01)
G06K 9/00 (2006.01)
G06F 3/01 (2006.01)

(52) U.S. Cl.
CPC ......... G06K 9/00604 (2013.01); G06F 3/013 (2013.01); G06T 7/80 (2017.01)

(58) Field of Classification Search
CPC .... G06K 9/00604; G06F 3/013; G06T 7/0018
USPC ........................................................ 348/78
See application file for complete search history.

(56) References Cited

U.S. PATENT DOCUMENTS

| 7,742,623 | B1* | 6/2010 | Moon | G06K 9/00604 |
| | | | | 382/103 |
| 2003/0218672 | A1* | 11/2003 | Zhang | H04N 7/15 |
| | | | | 348/14.16 |
| 2004/0174496 | A1 | 9/2004 | Ji et al. | |
| 2004/0227693 | A1* | 11/2004 | Rambo | H04N 7/144 |
| | | | | 345/6 |
| 2008/0297586 | A1* | 12/2008 | Kurtz | H04N 7/147 |
| | | | | 348/14.08 |

OTHER PUBLICATIONS

International Search Report & Written Opinion Received for PCT Application No. PCT/US2015/020178, Mailed Date: Oct. 23, 2015, 11 Pages.
Coutinho, et al., "Augmenting the Robustness of Cross-Ratio Gaze Tracking Methods to Head Movement", In Proceedings of the Symposium on Eye Tracking Research and Applications, Jan. 1, 2012, 8 Pages.
Huang, et al., "Towards Accurate and Robust Cross-Ratio Based Gaze Trackers Through Learning from Simulation", In Proceeding of the Eye Tracking Research and Applications, Mar. 26, 2014, 8 Pages.

(Continued)

Primary Examiner — William C Vaughn, Jr.
Assistant Examiner — Jae N Noh

(57) ABSTRACT

The subject disclosure is directed towards eye gaze detection based upon multiple cameras and/or light sources along with an adaptive homography mapping model. Learning of the model includes compensating for spatially-varying gaze errors and head pose dependent errors simultaneously in a unified framework. Aspects including training the model of adaptive homography offline using simulated data at various head positions.

20 Claims, 9 Drawing Sheets

(56) References Cited

OTHER PUBLICATIONS

Kang, et al., "Simplifying the Cross-Ratios Method of Point-of-Gaze Estimation", Retrieved at <<http://wjamesmaclean.net/Papers/kang_cmbec07.pdf>> Jan. 1, 2007, 4 Pages.

Yoo, et al., "A Novel Non-Intrusive Eye Gaze Estimation Using Cross-Ratio Under Large Head Motion", In Proceeding of Computer Vision and Image Understanding, Academic Press, vol. 98, Issue 1, Apr. 1, 2005, 27 Pages.

International Preliminary Report on Patentability Issued in PCT Application No. PCT/US2015/020178, Mailed Date: May 20, 2016, 9 Pages.

Second Written Opinion Issued in PCT Application No. PCT/US2015/020178, Mailed Date: Mar. 9, 2016, 7 Pages.

* cited by examiner

EYE GAZE TRACKING BASED UPON ADAPTIVE HOMOGRAPHY MAPPING

BACKGROUND

As computers including mobile devices, handheld devices and related technology such as displays have evolved, human input mechanisms have similarly advanced. Natural user interfaces such as based upon speech recognition, head and skeletal tracking and gesture detection are becoming more widespread to supplement or in some cases replace keyboard, pointing device (mouse or stylus) and/or recognized symbol/handwriting input. Eye gaze detection (eye tracking) is another natural user interface technology.

One type of eye tracking technology is referred to as cross-ratio (CR) based eye-tracking. This technology exploits the invariance of a plane projectivity to enable remote gaze estimation of a subject using a single camera in an uncalibrated setup. In general, infrared light is projected towards a user, with corneal reflections from the user's eye (glints) sensed by the camera and processed to track the gaze.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

As a result of simplification assumptions, the performance of known CR-based eye gaze trackers decays significantly as the subject moves away from an initial (fixed) calibration position. At the same time, it is impractical to implement a system in which a subject needs to calibrate eye tracking in each of the many possible x, y and z head positions that occur in real-world usage. Thus, an improved technology is desired for CR-based and other eye gaze trackers.

Briefly, various aspects of the subject matter described herein are directed towards adaptive homography mapping for achieving gaze detection. In one or more aspects, at least four light sources generate corneal reflections as glints from a subject's eye, and a camera is configured to capture a current image containing the glints. An adaptive homography mapping model learned via variables, including variables representative of head locations relative to a calibration position and/or gaze directions, is configured to match feature data corresponding to the glints, pupil-related data and/or gaze data to output gaze information indicative of where the subject's eye is currently gazing.

One or more aspects are directed towards using an adaptive homography mapping model for gaze detection, in which the adaptive homography mapping model is trained to compensate for spatially-varying gaze errors and head pose-dependent errors relative to a calibration position. Current glint data and pupil-related data is captured in an image, and processed from the image as features provided to the adaptive homography mapping model. Data is received from the adaptive homography mapping model based on the features that correspond to current gaze information.

One or more aspects are directed towards capturing an image including a subject's eye from which glint data and pupil-related data are extracted as features, and using the features as input to an adaptive homography mapping model to determine a gaze direction. The adaptive homography mapping model may be learned by using at least some simulated data corresponding to predicted bias correction values at different head positions. The adaptive homography mapping model may be learned by obtaining a first predictor variable comprising a motion vector corresponding to a relative head position, and obtaining a second predictor variable corresponding to a gaze direction. Learning may include minimizing an objective function based upon data corresponding to a plurality of head positions and gaze directions. In general, the adaptive homography mapping model uses scaling and translation for prediction and homography for correction.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
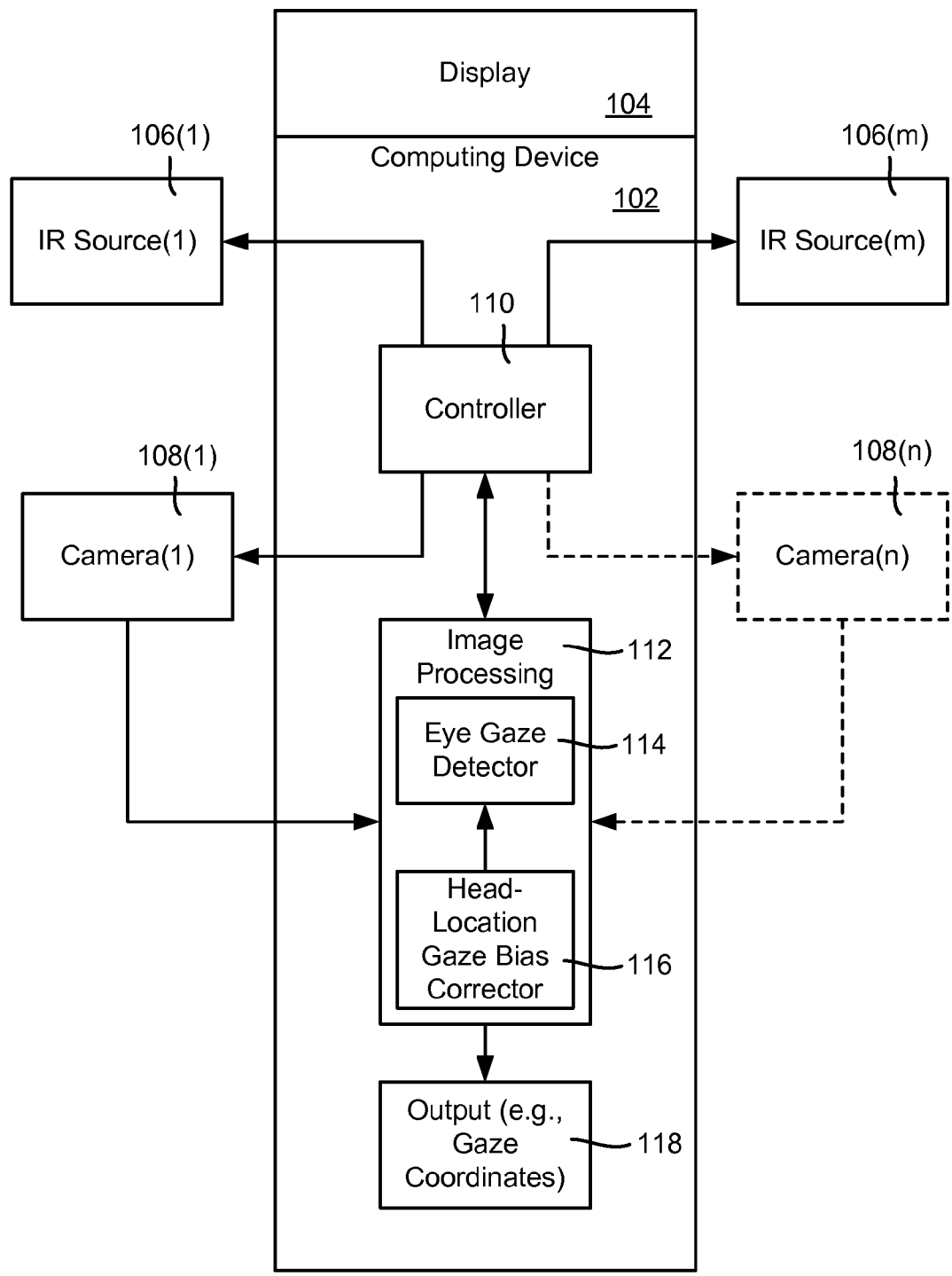
FIG. 1 is a block diagram illustrating example components including a learned adaptive homography mapping model that may be used in eye gaze detection, according to one or more example implementations.

Various aspects of the technology described herein are generally directed towards adaptive homography mapping for achieving gaze prediction with higher accuracy at the calibration position and more robustness under head movements. This is achieved with a learning-based technology for compensating spatially-varying gaze errors and head pose-dependent errors simultaneously in a unified framework. In one or more aspects, the model of adaptive homography may be trained offline using simulated data, saving significant time and effort in data collection; in other words, the subject need not be required to perform calibration at the many various possible head positions. For example, the scaling terms and translation terms for x, y change smoothly in practice, and thus the simulated data may include predictions as to how the bias correcting homography changes at a new head position, for use as (at least part of) the ground truth data.

As will be understood, adaptive homography mapping is based upon predictor variables capturing the head movement relative to the calibration position and the position of the gaze on the screen. Ground truth data for training the adaptive homography mapping may be collected through a series of subject-independent calibration at various head positions, including using simulation/simulated data at the positions.

During online operation, the trained model is used to adaptively correct the bias induced from spatially-varying gaze errors and head pose-dependent errors. In practice, this real-time operation is more accurate and more robust to head movement than other known eye-gaze technologies.

To this end, the learning-based adaptation approach simultaneously compensates for spatially-varying errors and errors induced from head movements by using glint transformation, e.g., the distance between glints and/or size variation of the glint pattern by considering the geometric transformation between the glint patterns. The resultant model not only compensates for a subject's depth variations, but for movements parallel to the screen plane. Note that while the adaptation function may be obtained through a learning process trained on simulated data, however any prior knowledge about the system setup (if available) can be easily incorporated into the system.

It should be understood that any of the examples herein are non-limiting. For example, while four light sources and a camera are exemplified, any number of cameras and light sources (that provide a suitable glint pattern) may be positioned in any number of ways. Moreover, the algorithms and the like used to detect eye gaze are only examples, and the technology described herein is independent of and not limited to any particular one, and further is able to be adapted as new algorithms are developed. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in eye gaze detection in general.

FIG. 1 is a general block diagram illustrating example components that may be used to perform eye gaze detection. In FIG. 1, a computing device 102 and display 104 are shown. The display 104 may be an external display coupled to the computing device or a display incorporated into the computer device, e.g., its housing.

As shown in FIG. 1, a plurality of IR light sources 106(1)-106(m) is shown, along with one or more IR light-sensitive cameras 108(1)-108(n). Note that for cross-ratio-based eye gaze detection, a single camera is typically sufficient, however if present, images from multiple cameras may be processed and combined in some way (e.g., averaged) such as to reduce the effects of noise.

The light sources may be individual light sources such as laser light emitting diodes (LEDs), and/or LEDs or the like that project through an optical element that diffracts/reflects the light, thereby providing a plurality of light sources. Note that any or all of the IR light-sensitive cameras may be combined with visible light cameras. Note further that the camera (or cameras) may be attached to the device, e.g., embedded in an edge (e.g., the camera 208 of FIG. 2 represented by the circled X) or physically coupled to the device, or may be external to the device (e.g., the camera 408 of FIG. 4), or a combination of both.

Figure 2:
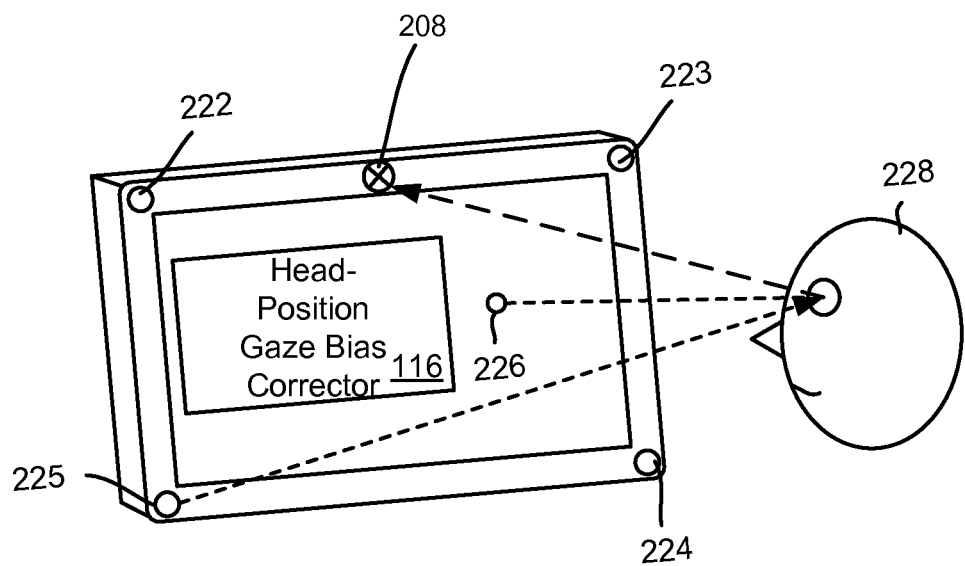
FIG. 2 is a representation of how a glint is captured for use in gaze detection for use as a feature to a learned adaptive homography mapping model for gaze detection, according to one or more example implementations.
Figure 3:
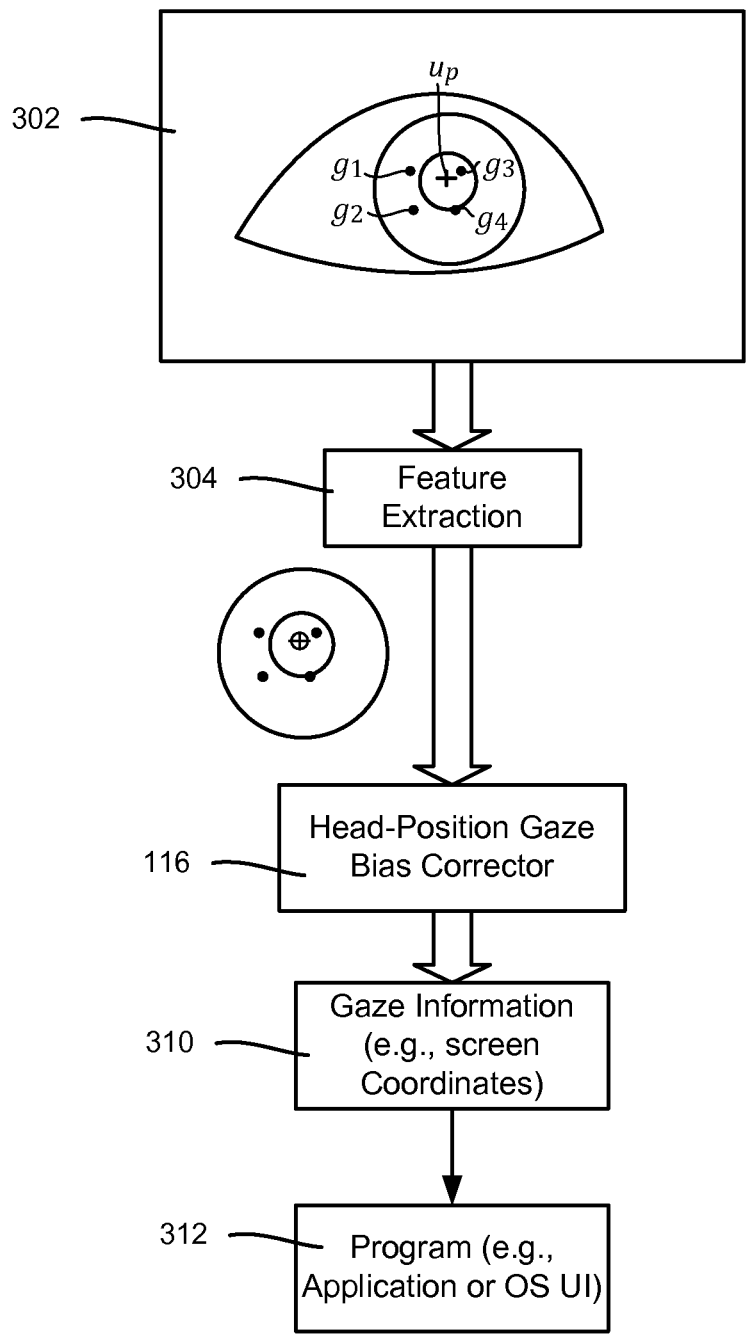
FIG. 3 is a representation of how glints and pupil-related data (e.g., the pupil center) are used to obtain gaze information from a learned adaptive homography mapping model, according to one or more example implementations.

As is understood in cross-ratio based eye-tracking, at least four light sources are needed to provide the glints to compute the homography, and these light sources are arranged such that there are at least three different directions between any one of them and the others providing a quadrilateral, e.g., a rectangular pattern of sources 222-225 as in FIG. 2 is a typical arrangement. Notwithstanding, other arrangements including more light source are feasible, and, for example, may provide benefits such as providing at least four glints when one of the other glints is not detected.

A controller 110 may be used to control the operation of the IR light sources 106(1)-106(m) and/or IR light-sensitive cameras 108(1)-108(n), although in one or more implementations the light sources and cameras may be "always-on" whereby no "controller" other than a power source presumably with on/off capabilities is needed. Note that IR light is used because it is not noticeable to humans, however in certain situations it may be desirable to use visible light, such as with the subject's eyes wearing contact lenses that block the particular visible light wavelength being used. Thus, as used herein, "light source" is not limited to IR wavelengths.

In general, the one or more cameras 108(1)-108(n) capture images that are fed to an image processing component 112, including an eye gaze detector 114, which is coupled to or incorporates a head-position gaze bias corrector 116; as described herein the bias corrector includes a trained adaptive homography mapping component. The image processing component 112 provides an eye gaze detection output 118, such as gaze coordinates representative of where the user is currently gazing in the given frame or the like being processed. Such output 118 may be buffered, such as for use with other input (e.g., mouse clicks or gestures), may be consumed by an operating system (e.g., to move a cursor), may be used by an application (e.g., to highlight a menu item) and/or the like. In general, the current gaze information may be used to take action with respect to changing a state of a user interface. Eye gaze detection may be used for other state changes, e.g., to turn on a display to an active state from a standby or off state, (or vice-versa), possibly in combination with other (e.g., gesture) detection such as an eye-blinking pattern.

With respect to the eye gaze detector 114, any existing or to-be-developed techniques (such as cross-ratio technology) may be employed to convert sensed glints, pupil data and any other captured features into the eye gaze information output 118. Decisions of one or more as techniques may be combined (e.g., averaged) to make the final output. As described herein, the head-position gaze bias corrector 116 provides the eye gaze detection algorithm 114 with bias-correction that is more accurate and robust than other bias-correction techniques.

In general, remote gaze tracking systems operate using the infrared light sources to generate corneal reflections, referred to as glints, which are captured as part of the subject's eye images. The captured images are processed to extract informative features that are invariant to illumination and viewpoint, such as pupil center, the corneal reflections (e.g., indicative of the eyeball's position) and/or limbus contour.

Note that in FIG. 2, the concept of glints reflected from the IR light source 225 is shown as being captured by the camera 208 while the user is looking at a current gaze location 226 on the screen. As can be readily appreciated, glints from the other light sources 222-224 are similarly captured at the same time (although only one such set of arrows to the eye/reflected to the camera is shown in FIG. 2).

As is understood, the head position of the subject 228 and gaze location 226 influence the positions and sizes of the glints $g_1$-$g_4$ that are captured. This information, along with other information such as the pupil center $u_p$, correspond to feature data 304 extracted from the image 302, which is fed to the learned head-position gaze bias corrector 116. From there, gaze information 310 such as screen coordinates are obtained and provided to a program 312.

As described herein, homography-based methods for gaze estimation bias correction can in some circumstance increase accuracy and/or robustness of gaze estimation. Nomography based method for bias correction can implement a bias-correcting homography transformation. The bias correcting homography transformation can be computed by solving the point set registration problem from the predicted gaze points by the basic cross-ratio method to ground truth targets on the screen during a calibration training phase.

Figure 4:
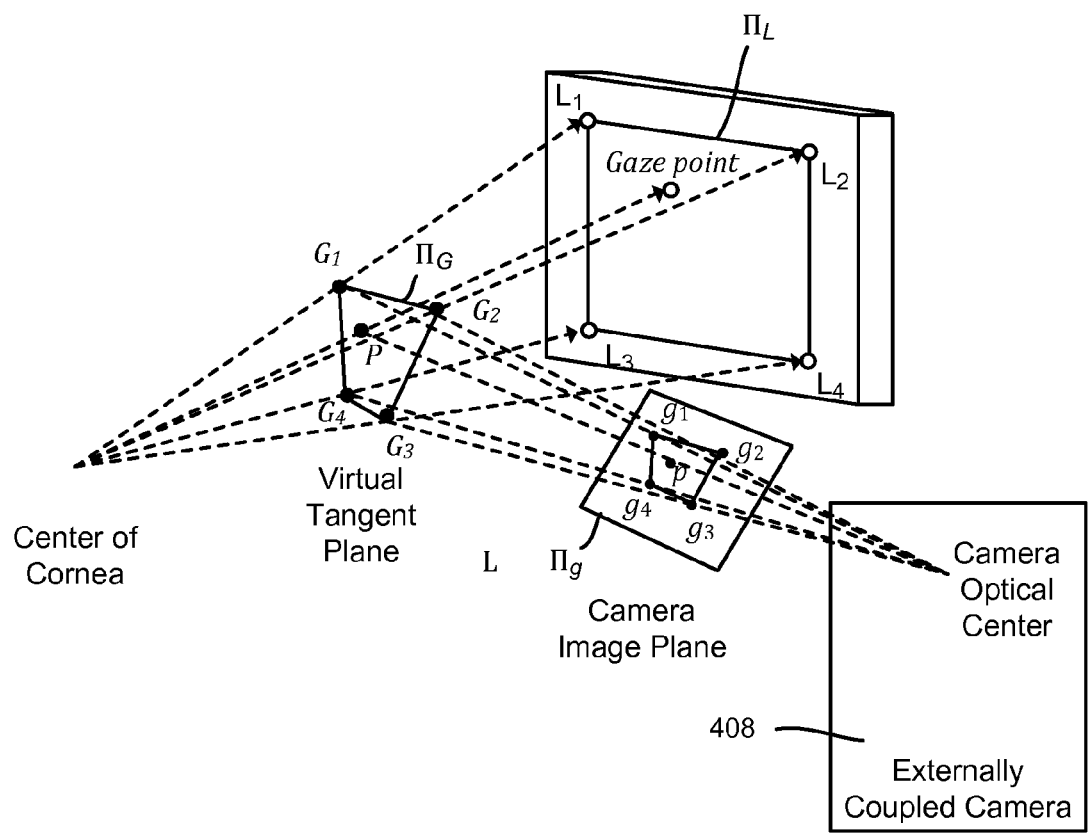
FIG. 4 is a representation of how cross-ratio-based transformations may be used to train an adaptive homography mapping model, according to one or more example implementations.

In general, homograph-based methods generally work well at the calibration position because they effectively model the optical and visual axis offsets, as generally represented in FIG. 4. However, due to the model error from the planarity assumption on pupil center and the plane formed by glints, spatially-varying errors arise. For accurate prediction, the bias correcting homography mapping needs to depend on the subject's gaze direction.

The performance of homography-based methods degrade significantly when the subject moves away from the calibration position because the optimal bias-correcting homography is a function of head positions. One or more aspects described herein are directed to adaptive homography mapping, which is directed towards "predicting" how the bias correcting homography changes at a new head position, such that the performance of the gaze tracker will be as if it were calibrated at that new head position. Described is a scheme to predict the variation of the bias correcting homography computed at the calibration position based upon the relative changes between the current head position and the calibration position and the current gaze direction.

With respect to homography mapping cross-ratio with homography-based bias correction, as generally shown in FIG. 4, denote $L_i$ as the point light sources located at the four screen corners ($1 \leq i \leq 4$), $G_i$ as the corresponding corneal reflections and $g_i$ as the images of $G_i$. P is the pupil center in 3D and p as its projection in the image. Although four point light sources are shown at the screen corners, multiple lights sources of many different structures, numbers, placements, may be used as appropriate and four corner light are shown here for example purposes. The cross-ratio method assumes each of the group ($L_i$, $G_i$, $g_i$) is co-planar, denoted as plane $\Pi_L$, $\Pi_G$, $\Pi_g$ respectively. The transformation between planes $\Pi_L$, $\Pi_G$, $\Pi_g$ may be described through homographies. Under the assumption that the pupil center P lies in $\Pi_G$, the point of regard prediction is given by:

$$PoR_{CR}=H_{GL}(H_{gG}(p))=H_{CR}(p) \quad (1)$$

where $H_{gG}$ maps plane $\Pi_g$ to plane $\Pi_G$, $H_{GL}$ maps plane $\Pi_G$ to plane $\Pi_L$, and $H_{CR}$ is the combined transform of $H_{GL}$ and $H_{gG}$. However, because these simplification assumptions are not valid in practice, large gaze estimation bias is observed.

Homography-based techniques apply another homography transformation to correct this gaze estimation bias. In one technique, the glints in images are first mapped onto a normalized space (e.g., a unitary square $\Pi_N$) with the bias-correcting homography used to map the estimated gaze points in the normalized space to the expected gaze points in the screen space $\Pi_L$. The point of regard prediction by homography-based prediction is given by:

$$PoR_{HOM}=H_{NL}(H_{CR}^N(p)) \quad (2)$$

where $H_{CR}^N$ maps the image space to the normalized space and $H_{NL}$ maps the normalized space to the screen space. Denoting v as the index for the target position on the screen, V as the set of the target index, and $t_v$ as the target position in the screen space, a goal of the subject-dependent calibration is to find the optimal bias-correcting homography $H^*_{NL}$ that minimizes the re-projection errors:

$$H^*_{NL} = \operatorname*{argmin}_{H_{NL}} \sum_{v \in V} \|t_v - H_{NL}(H_{CR}^N(p_v))\|_2^2, \quad (3)$$

where $p_v$ is the 2D pupil center position in the image when gazing at target v.

Described herein is adaptive homography mapping, which models the variation of the bias-correcting homography $H_{NL}$ using another homography mapping $H_A$. The point of regard by the adaptive homography is given by:

$$PoR_{AH}=H_{NL}(H_A(H_{CR}(p))) \quad (4)$$

Note that in Equation (4), the bias-correcting homography $H_{NL}$ is computed by the same minimization process in Equation (3) at the calibration and remains unchanged for the same subject. In contrast, the adaptive homography mapping $H_A$ needs to vary adaptively to the current head position relative to the calibration position as well as the gaze direction. In one or more aspects, adaptive homography is described herein as a regression problem. That is, given predictor variables describing the relative head position and gaze direction, the system wants to predict the values in $H_A$.

Different types of predictor variables may be used, including, without limitation, movement (corresponding to head position) and gaze direction, $x=[x_m, x_g]^T$. First, the head movements relative to the calibration position are captured using the geometric transformation between the glints' quadrilateral stored at the calibration position and the current glints' quadrilateral. In practice, affine or similarity transformation may be used to encode the relative movement. For example, when the subject moves toward the screen after calibration, the scale term of the transformation will be greater than one. Homograhy transformation is another suitable technique generally described above with respect to bias correction in general.

The first type of predictor variable $x_m$ is obtained by vectorizing the motion parameters. There is a six-dimensional vector for $x_m$ when using affine transformation or a four-dimensional vector for $x_m$ when using similarity transformation. Further, for encoding the gaze direction for spatially-varying mapping, pupil-related data is used as one of the features, e.g., the pupil center position in the normalized space $x_g=H_{CR}(p-p_0)$, where $p_0$ is the pupil center position when gazed at the center of the screen.

With these predictor variables, the adaptive homography may be modeled as polynomial regression of degree two (i.e., quadratic regression):

$$H_{A,x}=f(x,\beta) \quad (5)$$

In the quadratic regression, the values of the adaptive homography are linear with the predictor variables, which contain a constant term, linear terms, quadratic terms, as well as the interaction terms.

Error compensation for depth variation may be achieved by adaptively scaling the translational correction vectors using the relative size of the glint quadrilaterals at the calibration position and the current position. In one or more implementations, the technology described herein considers a richer set of transformations than scaling for prediction and uses homography (instead of translation only) for correction. The values of the optimal bias-correcting homographies are dependent on the head movements.

Note that instead of having a subject calibrate gaze at each possible head position, in one or more implementations, error compensation can be achieved by first learning the adaption through simulation data, and then predicting the current translation vector using that simulated training data for learning the adaptation. Using this methodology can save significant subject calibration time and effort as well as improve computational speed. In addition, the use of simulation allows using a more complex model than simply translation for prediction.

Figure 5:
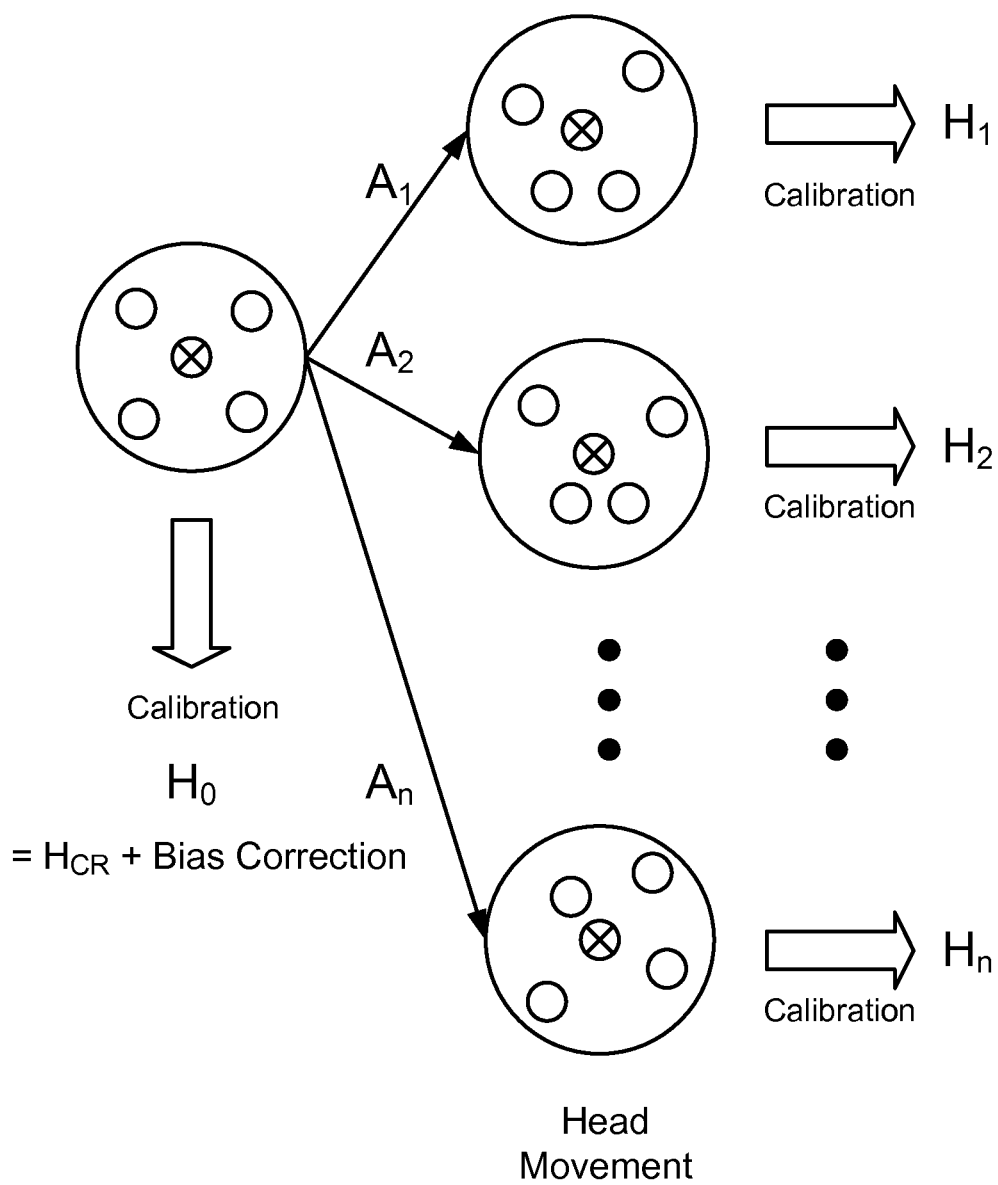
FIG. 5 is a representation of training an adaptive homography mapping model at various head positions, according to one or more example implementations.

FIG. 5 sums up the overall process of one implementation. During training, each of the various transformations (e.g., affine transformations A) for the head positions $H_0$ to $H_n$ and gaze positions are known, and can be represented as $X=\{(A_1, g_1), (A_2, g_2), \ldots, (A_n, g_n)\}$. The corresponding head positions shown in FIG. 5 as $H_0$ to $H_n$ are known during training, such that Y can be learned, $Y=\{H_0^{-1}H_1, H_0^{-1}H_2, \ldots, H_0^{-1}H_n\}$. Note that the ground truth training data may be simulated data, at least in part.

Thus, as described above, the training operation obtains the data that is used to learn a regression function $f: X \to Y$ (Polynomial of degree 2). These learned head positions and/or regression function based on the trained data may be stored in any appropriate manner and accessible to the gaze tracking system of FIG. 1 such as in local storage and/or cloud storage.

During usage by the current user which may be within an application, an online environment, within a base operating system of a computing device, etc., the affine registration A of a current set of glints corresponding to the captured glint positions is obtained via image capturing. Once this is obtained along with the gaze direction g, using the regression: $y=f(x)$ with $x=(A, g)$ provides for the bias correcting homography: $H=H_0y$.

With respect to learning homography adaptation, denote u as the head position in three dimensions and U as the set of sampled head positions. A suitable objective function is defined as:

$$L(\beta) = \Sigma_{u \in U} \Sigma_{v \in V} \|t_{u,v} - H^*_{NL}(H_{A,x}(H_{CR}^N(p_{u,v})))\|_2^2, \quad (6)$$

where $H_{A,x}=f(x,\beta)$ (equation (5)) is the quadratic regression model for adaptive homography. A goal of learning adaptive homography is to find a matrix of coefficients that minimize the re-projection errors by summing the squared errors between the predicted gaze positions and the ground truth ones on the screen when the simulated subjects are located at the sampled head positions.

To minimize the objective function defined in Equation (6), a two-step approach may be used. First, the prediction function may be estimated by minimizing an algebraic error. At each head position u, compute the optimal bias correcting homography $H_{NL}^u$ by performing a subject-dependent calibration at position u. Ideally up to a scale factor, $H_{NL}^u = H^*_{NL} H_{A,x}$. The process can thus minimize the algebraic errors between the prediction $H_{A,x}=v(x_{u,v},\beta)$ and the difference of the bias correcting homography $(H^*_{NL})^{-1}(H_{NL}^u)$ (with the last element normalized to 1), where the $H^*_{NL}$ is the bias-correcting homography computed at the default calibration position. The algebraic error minimization can thus be formulated as:

$$\beta^a = \operatorname*{argmin}_{\beta} \sum_{u \in U} \sum_{v \in V} \|(H^*_{NL})^{-1}(H_{NL}^u) - f(x_{u,v,\beta})\|_2^2, \quad (7)$$

where $\beta^a$ is the estimated matrix of coefficients after minimizing the algebraic errors.

Second, to minimize the re-projection errors in Equation (6), the process may start with the initial solution using $\beta^a$, and perform nonlinear least square optimization using the Levenberg-Marquardt algorithm.

Turning to one example implementation of the calibration process, a set of training subjects are used, each asked to gaze at a regular n×n, n∈{2, 3, 4, 5} grid pattern that is uniformly distributed over the screen. In one training scenario, a uniformly distributed 5×5 grid on the screen was used. For collection of the training data, define the screen plane as the x-y plane and the depth from screen as the z-axis in the world coordinate system. A typical working space in front of the screen may be sampled using a 5×5×5 grid with ranges from −200 mm to 200 mm, centered at position [0, 0, 600] mm. At each head position u, perform subject-dependent calibration in Equation (3), e.g., using an n×n (e.g., 5×5) calibration pattern on the screen. To account for subjects with different eye parameters, randomly sample some number of (e.g., fifty) virtual subjects using Gaussian distributions with means of typical eye parameters and standard deviations of ten percent of the values of the parameter. For example, the typical size of corneal radius is 7.8 mm. The process then draws random samples using a Gaussian distribution with mean 7.8 and standard deviation 0.78.

For example, starting with typical eye parameters (corneal radius $R_c$=7.8 mm, distance from corneal center to pupil center K=4.2 mm, horizontal and vertical angular deviation is 5.0 degrees and 1.5 degrees, the process varies the value of each eye parameter with [−30, 30]% of the original values.

Figure 6A:
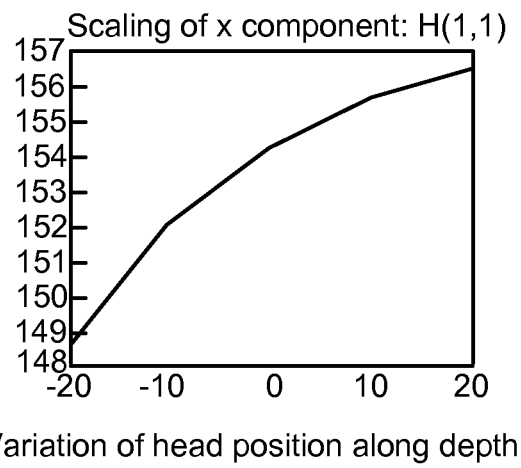
FIGS. 6A and 6B, and 7A and 7B are example representations of how simulated training data may be based upon smooth scaling and translation variations due to head movement, according to one or more example implementations.
Figure 6B:
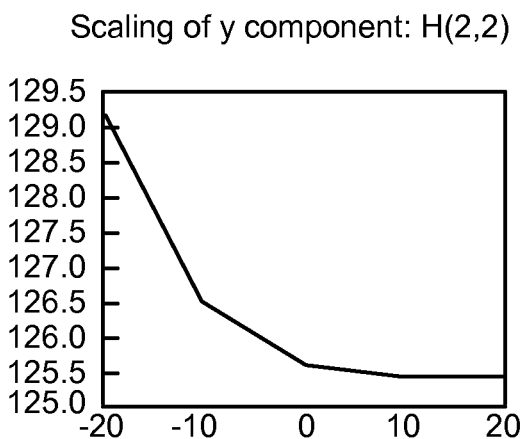
Figure 7A:
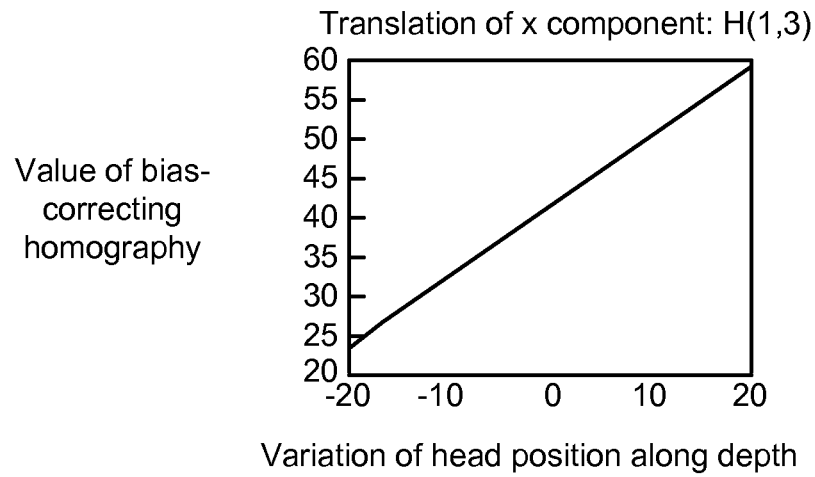
Figure 7B:
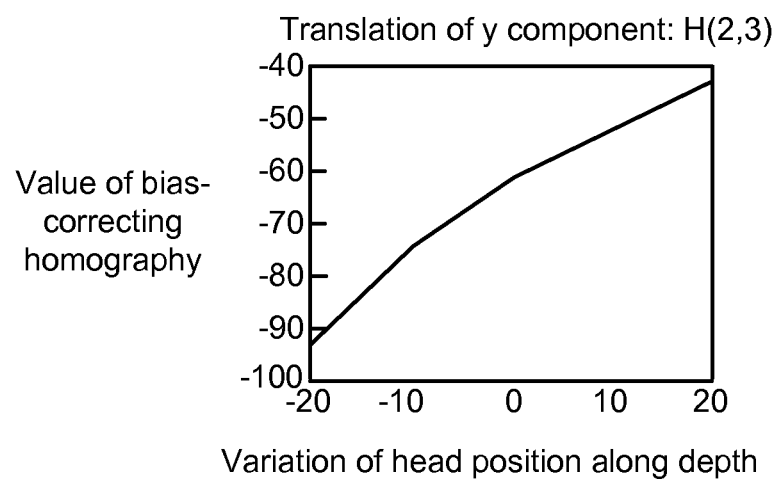

Instead of or in addition to actual data of subjects, simulated data may be used. For example, FIGS. 6A and 6B show plots of values of the optimal bias-correcting homography computed at different head positions along the depth axis for the scaling on x, y. FIGS. 7A and 7B show similar plots for translation on x, y. Note that the last element of each homography is normalized to one. As can be seen, the plots are smooth. Thus, optimal values may be predicted as simulated data for the ground truth.

Note that using simulated data instead of actual calibration data for a subject is not limited to cross-ratio technology. Other eye gaze detection solutions, such as model-based methods (which estimate a 3D gaze vector and compute 2D points of interest by intersecting 3D rays with the 2D screen plane), may also use simulation for calibration.

Figure 8:
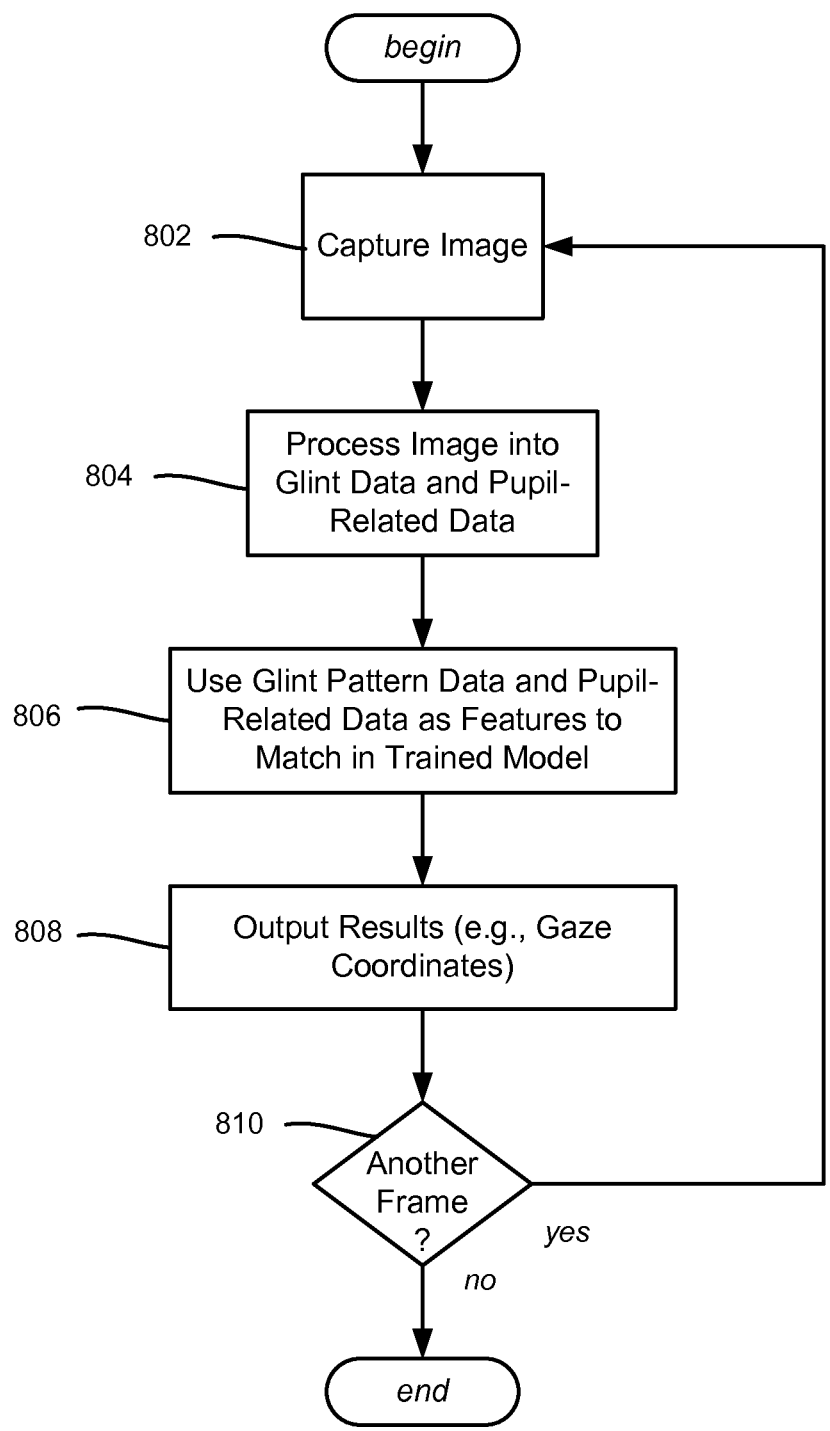
FIG. 8 is a flow diagram illustrating example steps that may be taken to obtain gaze information from a learned adaptive homography mapping model, according to one or more example implementations.

FIG. 8 is a generalized flow diagram showing example steps in actual usage of the learned adaptive homography model. Step 802 captures the image, which is processed (step 804) into the glint data and pupil-related data for use as features (step 808). The trained model uses the feature data to determine the head-position correction data used to compute the corrected gaze information, e.g., the coordinates (or general grid identifier) where the subject's eye is gazing at the screen which may be output to a buffer or the like for consumption by the operating environment of the gaze tracking system, such as an application, on line environment, operating system, etc. The gaze information results can be used in many different scenarios including for natural user interface interactions, attention determination for user interest interpretation, etc. Step 810 repeats the process for another frame; the frame rate or some smoothing operation may be used to prevent too much jumping around. In response to the changes gaze coordinates, the gaze tracking system may trigger another action or response of the gaze tracking system depending on the change in the gaze of the user, e.g., trigger or stop or initiate a different natural user interface interaction, indicate a different attention determination for user interest interpretation, etc.

Adaptive homography, such as that described in the methodology described above, provides accuracy beyond known homography-based methods because in addition to correcting biases from head movement, the adaptive homography also accounts for the spatially-varying gaze errors predicted by the pupil position in the normalized space $x_g$.

The above technology may be combined with other eye gaze tracking technologies. For example, the technology described herein may be combined in a system with another technology based upon two eyes, such as described in copending U.S. patent application entitled "EYE GAZE TRACKING USING BINOCULAR FIXATION CONSTRAINTS" filed concurrently herewith, Ser. No. 14/226/136.

As can be seen, there is provided a system comprising, at least four light sources and a camera, in which the light sources configured to generate corneal reflections as glints from a subject's eye, and the camera is configured to capture a current image containing the glints. An adaptive homography mapping model learned via variables, including variables representative of head locations relative to a calibration position and/or gaze directions, is configured to match feature data corresponding to the glints, pupil-related data and/or gaze data to output gaze information indicative of where the subject's eye is currently gazing.

In one or more aspects, the variables representative of head locations relative to a calibration position and gaze positions may be based at least in part on simulated data. The simulated data may be used to represent ground truth data for training the adaptive homography mapping through calibration to obtain the predictor variables at various head positions. The ground truth data models the adaptive homography as a polynomial regression.

In one or more aspects, the variables representative of head locations relative to a calibration position correspond to relative head movements among the various head positions encoded by affine transformations, similarity transformations or homography transformations. The variables representative of gaze directions are encoded by pupil-related data.

One or more aspects are directed towards using an adaptive homography mapping model for gaze detection, in which the adaptive homography mapping model is trained to compensate for spatially-varying gaze errors and head pose-dependent errors relative to a calibration position. Current glint data and pupil-related data is captured in an image, and processed from the image as features provided to the adaptive homography mapping model. Data is received from the adaptive homography mapping model based on the features that correspond to current gaze information.

One or more aspects are directed towards learning the adaptive homography mapping model, including using plurality of sets of position data and pupil-related data as predictor variables for modeling the adaptive homography as a quadratic regression. Using the plurality of sets of position data and pupil position data may comprise using at least some simulated data, e.g., by predicting bias correction values at different head position scaling and/or translations.

One or more aspects are directed towards capturing an image including a subject's eye from which glint data and pupil-related data are extracted as features, and using the features as input to an adaptive homography mapping model to determine a gaze direction. The adaptive homography mapping model may be learned by using at least some simulated data corresponding to predicted bias correction values at different head positions. The adaptive homography mapping model may be learned by obtaining a first predictor variable comprising a motion vector corresponding to a relative head position, and obtaining a second predictor variable corresponding to a gaze direction. Learning may include minimizing an objective function based upon data corresponding to a plurality of head positions and gaze directions. In general, the adaptive homography mapping model uses scaling and translation for prediction and homography for correction.

Example Operating Environment

Figure 9:
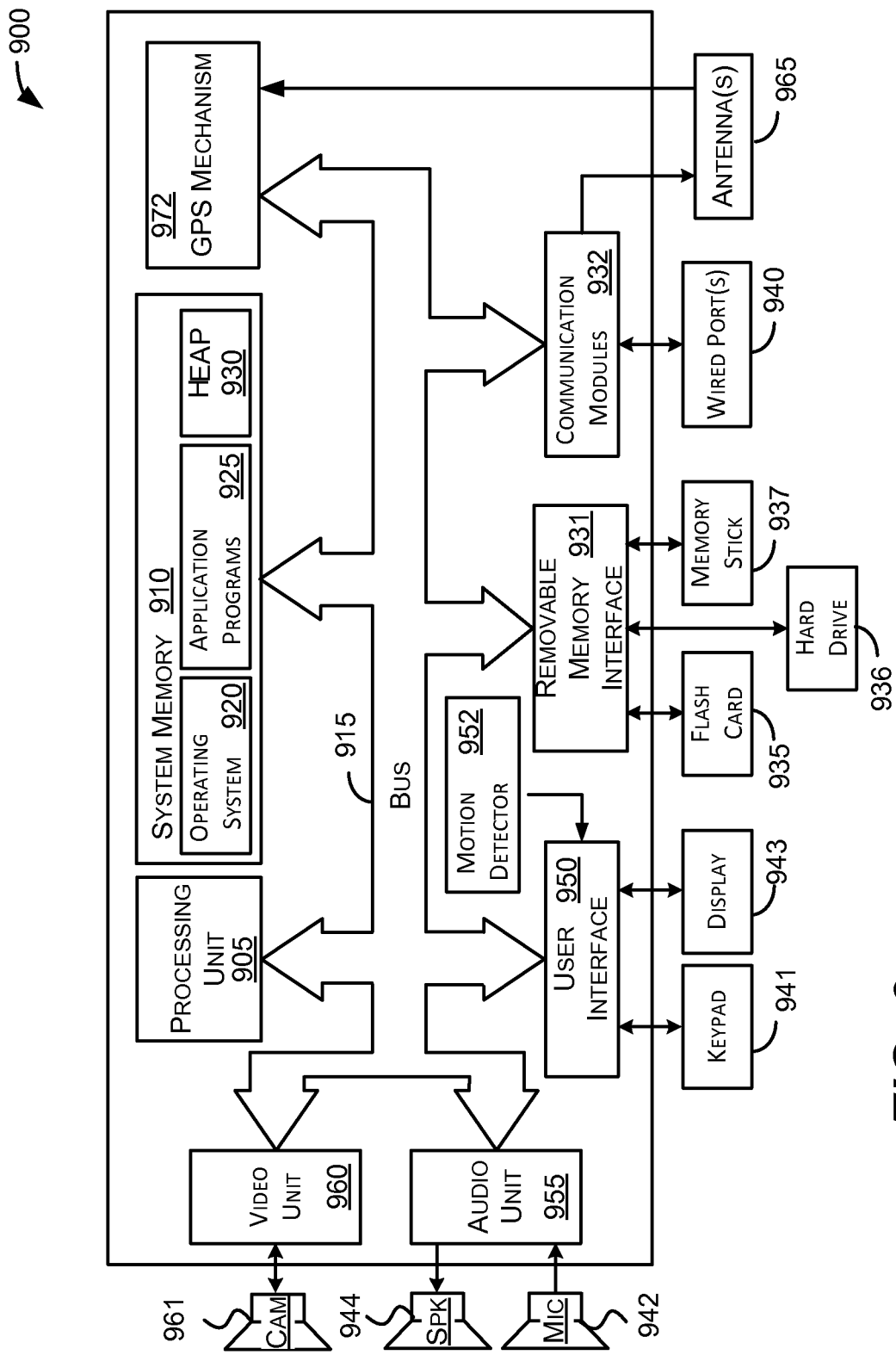
FIG. 9 is a block diagram representing an exemplary non-limiting computing system or operating environment, in the form of a mobile and/or handheld computing and/or communications device, into which one or more aspects of various embodiments described herein can be implemented.

FIG. 9 illustrates an example of a suitable mobile device 900 on which aspects of the subject matter described herein may be implemented. The mobile device 900 is only one example of a device and is not intended to suggest any limitation as to the scope of use or functionality of aspects of the subject matter described herein. Neither should the mobile device 900 be interpreted as having any dependency or requirement relating to any one or combination of components illustrated in the example mobile device 900. The mobile device may comprise a hand-held device such as a smartphone, tablet, laptop and so on. A personal computer may alternatively be used, for example, with camera(s) and light sources mounted to the display.

The example mobile device 900 may be worn on glasses, goggles or hats, or other wearable devices such as wristwatch-type devices, including external computers are all suitable environments. Note that although glasses and hats are worn on the head, they may be worn in different positions relative to the head, and thus head position bias correction may be appropriate.

With reference to FIG. 9, an example device for implementing aspects of the subject matter described herein includes a mobile device 900. In some embodiments, the mobile device 900 comprises a cell phone, a handheld device that allows voice communications with others, some other voice communications device, or the like. In these embodiments, the mobile device 900 may be equipped with a camera for taking pictures, although this may not be required in other embodiments. In other embodiments, the mobile device 900 may comprise a personal digital assistant (PDA), hand-held gaming device, notebook computer, printer, appliance including a set-top, media center, or other appliance, other mobile devices, or the like. In yet other embodiments, the mobile device 900 may comprise devices that are generally considered non-mobile such as personal computers, servers, or the like.

Components of the mobile device 900 may include, but are not limited to, a processing unit 905, system memory 910, and a bus 915 that couples various system components including the system memory 910 to the processing unit 905. The bus 915 may include any of several types of bus structures including a memory bus, memory controller, a peripheral bus, and a local bus using any of a variety of bus architectures, and the like. The bus 915 allows data to be transmitted between various components of the mobile device 900.

The mobile device 900 may include a variety of computer-readable/machine-readable media. Such media can be any available media that can be accessed by the mobile device 900 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 900.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, Wi-Fi, WiMAX, and other wireless media. Combinations of any of the above should also be included within the scope of computer-readable media.

The system memory 910 includes computer storage media in the form of volatile and/or nonvolatile memory and may include read only memory (ROM) and random access memory (RAM). On a mobile device such as a cell phone, operating system code 920 is sometimes included in ROM although, in other embodiments, this is not required. Similarly, application programs 925 are often placed in RAM although again, in other embodiments, application programs may be placed in ROM or in other computer-readable memory. The heap 930 provides memory for state associated with the operating system 920 and the application programs 925. For example, the operating system 920 and application programs 925 may store variables and data structures in the heap 930 during their operations.

The mobile device 900 may also include other removable/non-removable, volatile/nonvolatile memory. By way of example, FIG. 9 illustrates a flash card 935, a hard disk drive 936, and a memory stick 937. The hard disk drive 936 may be miniaturized to fit in a memory slot, for example. The mobile device 900 may interface with these types of non-volatile removable memory via a removable memory interface 931, or may be connected via a universal serial bus (USB), IEEE 9394, one or more of the wired port(s) 940, or antenna(s) 965. In these embodiments, the removable memory devices 935-937 may interface with the mobile device via the communications module(s) 932. In some embodiments, not all of these types of memory may be included on a single mobile device. In other embodiments, one or more of these and other types of removable memory may be included on a single mobile device.

In some embodiments, the hard disk drive 936 may be connected in such a way as to be more permanently attached to the mobile device 900. For example, the hard disk drive 936 may be connected to an interface such as parallel advanced technology attachment (PATA), serial advanced technology attachment (SATA) or otherwise, which may be connected to the bus 915. In such embodiments, removing the hard drive may involve removing a cover of the mobile device 900 and removing screws or other fasteners that connect the hard drive 936 to support structures within the mobile device 900.

The removable memory devices 935-937 and their associated computer storage media, discussed above and illustrated in FIG. 9, provide storage of computer-readable instructions, program modules, data structures, and other data for the mobile device 900. For example, the removable memory device or devices 935-937 may store images taken by the mobile device 900, voice recordings, contact information, programs, data for the programs and so forth.

A user may enter commands and information into the mobile device 900 through input devices such as a key pad 941 and the microphone 942. In some embodiments, the display 943 may be touch-sensitive screen and may allow a user to enter commands and information thereon. The key pad 941 and display 943 may be connected to the processing unit 905 through a user input interface 950 that is coupled to the bus 915, but may also be connected by other interface and bus structures, such as the communications module(s) 932 and wired port(s) 940. Motion detection 952 can be used to determine gestures made with the device 900.

As described herein, eye glints and other eye-related data may be captured and processed for input. The processing may be performed in software, in hardware logic, or in a combination of software and hardware logic.

A user may communicate with other users via speaking into the microphone 942 and via text messages that are entered on the key pad 941 or a touch sensitive display 943, for example. The audio unit 955 may provide electrical signals to drive the speaker 944 as well as receive and digitize audio signals received from the microphone 942.

The mobile device 900 may include a video unit 960 that provides signals to drive a camera 961. The video unit 960 may also receive images obtained by the camera 961 and provide these images to the processing unit 905 and/or memory included on the mobile device 900. The images obtained by the camera 961 may comprise video, one or more images that do not form a video, or some combination thereof.

The communication module(s) 932 may provide signals to and receive signals from one or more antenna(s) 965. One of the antenna(s) 965 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 972. In turn, the GPS mechanism 972 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 900 may connect to one or more remote devices. The remote devices may include a personal computer, a server, a router, a network PC, a cell phone, a media playback device, a peer device or other common network node, and typically includes many or all of the elements described above relative to the mobile device 900.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server may be used herein, it will be recognized that this term may also encompass a client, a set of one or more processes distributed on one or more computers, one or more stand-alone storage devices, a set of one or more other devices, a combination of one or more of the above, and the like.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A system comprising:
    at least four light sources for generating corneal reflections as glints from a subject's eye;
    a camera for capturing a current image containing the glints;
    an eye gaze detector incorporating or coupled to a gaze head-position bias corrector, the eye gaze detector:
        receiving the current image containing the glints; and
        estimating an eye gaze of the subject's eye;
    the gaze bias corrector;
        receiving the estimated eye gaze of the subject's eye; and
        correcting a bias in the estimated eye gaze by matching feature data corresponding to the glints and pupil-related data of the subject to output corrected gaze information indicative of where the subject's eye is currently gazing, the feature data comprising positions and sizes of the glints; and
    the gaze-head position bias corrector correcting the bias in the estimated eye gaze using an adaptive homography mapping transformation trained to compensate for spatially-varying gaze errors and head pose-dependent errors relative to a calibration position using a relative head position.

2. The system of claim 1 wherein the relative head position is based at least in part on simulated data.

3. The system of claim 2 wherein the simulated data collects ground truth data for training the adaptive homography mapping through calibration to obtain predictor variables at various head positions.

4. The system of claim 3 wherein the adaptive homography of the ground truth data is based at least in part on a polynomial regression.

5. The system of claim 1 wherein the relative head position corresponds to relative head movements among the various head positions encoded at least in part by affine transformations.

6. The system of claim 1 wherein the relative head position corresponds to relative head movements among the various head positions encoded at least in part by similarity transformations.

7. The system of claim 1 wherein the relative head position corresponds to relative head movements among the various head positions encoded at least in part by homography transformations.

8. The system of claim 1 wherein the adaptive homography mapping transformation trained to compensate for spatially-varying gaze errors and head pose-dependent errors relative to a calibration position uses gaze direction.

9. A method comprising:
    estimating gaze using adaptive homography mapping for bias correction, in which the adaptive homography mapping is trained to compensate for spatially-varying gaze errors and head pose-dependent errors relative to a calibration position including:
        capturing current glint data and pupil-related data in an image; and
        providing the current glint data and pupil-related data processed from the image as features to obtain head-pose dependent data, based upon the learned adaptive homography mapping, that are used to determine current gaze information, the features comprising positions and sizes of glints corresponding to the current glint data.

10. The method of claim 9 further comprising, learning the adaptive homography mapping model, including using plurality of sets of position data and pupil-related data as predictor variables for modeling the adaptive homography as a quadratic regression.

11. The method of claim 10 wherein using the plurality of sets of position data and pupil position data comprise using at least some simulated data.

12. The method of claim 11 wherein using at least some simulated data comprises predicting bias correction values at one or more of the following: different head position scalings, and different head position translations at different head position scalings and different head position translations.

13. The method of claim 10 wherein learning the adaptive homography mapping model comprises encoding relative head movements by affine transformations, by similarity transformations or homography transformations.

14. The method of claim 10 wherein learning the adaptive homography mapping model comprises encoding pupil-related data representative of gaze directions as one or more features.

15. The method of claim 9 further comprising, outputting the current gaze information, and using the current gaze information to take action with respect to changing a state of a user interface.

16. One or more machine-readable storage devices having executable instructions, which when executed perform operations comprising:
   capturing an image including a subject's eye from which glint data and pupil-related data are extracted as features; and
   using the features with adaptive homography mapping to determine a gaze direction based upon head position bias correction corresponding to the adaptive homography mapping that compensates for spatially-varying gaze errors and head pose-dependent errors relative to a calibration position using a relative head position, the features data comprising positions and sizes of glints corresponding to the glint data.

17. The one or more machine-readable storage devices of claim 16 having further executable instructions comprising learning the adaptive homography mapping by using at least some simulated data corresponding to predicted bias correction values at different head positions.

18. The one or more machine-readable storage devices of claim 16 having further executable instructions comprising learning the adaptive homography mapping model by obtaining a first predictor variable comprising a motion vector corresponding to a relative head position, and obtaining a second predictor variable corresponding to a gaze direction.

19. The one or more machine-readable storage devices of claim 16 having further executable instructions comprising learning the adaptive homography mapping model by minimizing an objective function based upon data corresponding to a plurality of head positions and gaze directions.

20. The one or more machine-readable storage devices of claim 16 wherein the adaptive homography mapping model uses scaling and translation for prediction and homography for correction.

* * * * *